Dec. 31, 1935.  O. E. LINCK  2,026,393

ANT TRAP

Filed June 15, 1933

INVENTOR
OTTO E. LINCK
BY
ATTORNEY

Patented Dec. 31, 1935

2,026,393

UNITED STATES PATENT OFFICE 2,026,393

ANT TRAP

Otto E. Linck, Upper Montclair, N. J.

Application June 15, 1933, Serial No. 675,889

2 Claims. (Cl. 43—121)

The present invention relates to ant traps and more particularly to an improved locking ant trap and a combination bait for sweet-eating ants and grease-eating ants to be used in the improved trap.

It is well known that heretofore various types of ant traps and various types of ant bait have been used. Of the ant baits, those most widely used were arsentical poisons. Due to the highly developed sense of taste of many species of ants, it was found, however, that they were able to detect even small traces of arsenical poisons. As soon as the ants detect the poisons, baits, or the ant traps containing such baits, the ants will not go near such traps and will not eat the baits or feed such baits to their young. In view of the trouble caused by ants and their unsightly appearance, particularly in the household, in food stores, in warehouses, in greenhouses, in orchards, on golf courses, and the like, the experts have been attempting to solve the problem confronting the art. Although various proposals have been made, none as far as I am aware have been wholly satisfactory and successful in practical use.

I have discovered an ant bait which is capable of attracting both sweet-eating ants and grease-eating ants, and which is effective in destroying colonies of such ants.

It is an object of the invention to provide an ant trap for the improved ant bait which can be maintained in practically an air sealed condition during shipment, storage and handling prior to actual use, and which can be made ready for use instantly by merely twisting the cover which is locked on to the bottom of the container.

It is another object of the invention to provide an ant trap which can be made of metal and which has such a construction that it can be manufactured easily and economically on a mass production scale by a can-making machine.

It is another object of the invention to provide an ant trap which is safe and which cannot be knocked apart by animals and small children.

It is also within the contemplation of the invention to provide an improved ant bait which is active to both sweeet-eating and grease-eating ants and which is repulsive to animals and small children.

Other objects and advantages of the present invention will become apparent from the following description taken in conjunction with the accompanying drawing in which.

Figure 1:
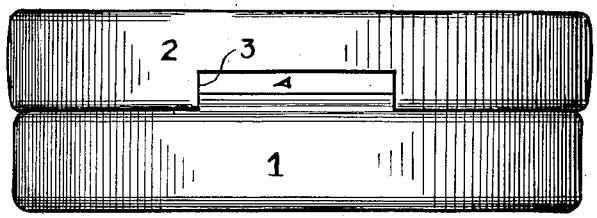
Fig. 1 is a side elevational view of the improved ant trap in an open condition ready for use.

Referring more particularly to Fig. 1, the ant trap comprises a metal container 1 on which a cover 2 is securely locked. The cover may be twisted about container 1 and may be adjusted to bring port 3 in alignment with a mating port in container 1 to provide an open window 4. The ants may gain access to and egress from the ant trap by means of window 4.

Figure 2:
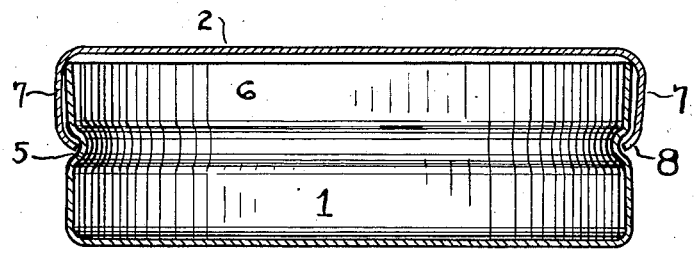
Fig. 2 is a cross-sectional view of the ant trap shown in Fig. 1.
Figure 3:
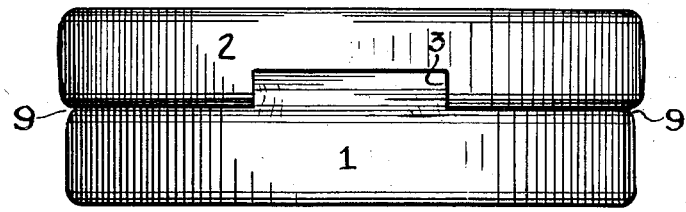
Fig. 3 is a side elevational view of the improved ant trap in a closed condition ready for shipment, handling or storage.

In Fig. 2, it will be observed that container 1 has an annular locking ring 5 extending about the periphery of the container at an intermediate position thereof. Above locking ring 5, the container extends in the form of a spring-like flange 6.

Cover 2 is provided with a relatively wide side 7 which extends downwardly and which coacts with the spring like flange 6. At the end of side 7 a locking tongue is provided which extends inwardly and which engages locking ring 5. With this construction, it will be observed that cover 2 may be twisted or turned about the container but cannot be easily removed therefrom. The positioned bait contained in the ant trap is protected and is enclosed so that animals and small children cannot touch the same.

After the ant trap has been charged with poisoned bait, the cover can be locked onto container 1 and the cover can be adjusted so that port 3 is out of alignment with the mating port in container 1. When the cover has been adjusted to this position, window 4 is closed and the ant trap is sealed. In this condition the ant trap may be transported, handled and stored with safety and the poisoned bait maintained in good condition. In the event that a further protection is desired, a seal may be provided about junction 9 between the cover and the container. Such a seal may take the form of a strip of tape of a suitable material. In practice, it is preferred to employ a ring of cellophane which is moistened and then slipped over the side of the box to completely seal junction 9.

Figure 4:
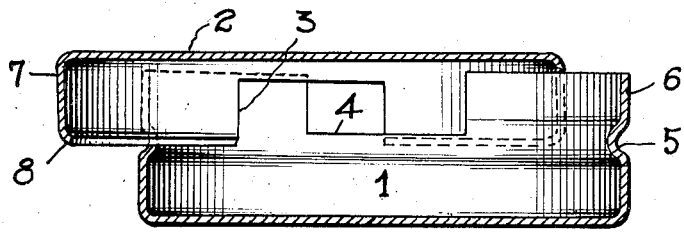
Fig. 4 illustrates an elevation view, partly in section, of the ant trap during its inital assembly, showing a part of the cover extending within the container.

Cover 2 may be made so that tongue 8 can be turned inwardly at a plurality of points or may be constructed so that the entire periphery is capable of being turned inwardly. It is preferred to have container 2 manufactured with tongue 8 bent inwardly. When cover 2 is manufactured in this way, it may be affixed or secured to container 1 by inserting a part of the side of the cover diagonally across the port of container 1 so that part of the cover extends within the container and another part extends outside of the container. In the same way a part of the side of the container is inserted diagonally across the port of the cover as this will appear from Fig. 4. The port of the cover nearest to the port of the container is located outside of the box whereas the part of the cover farthest from the container port is positioned inside of the container. As there is a certain amount of give in the spring-like flange 6, the cover and container may be twisted with respect to each other and the cover snaps on to the flange and is held in a locked position. By twisting the cover 2, port 3 may be adjusted to a position so that window 4 is closed or it may be adjusted to a position where window 4 is opened. Ordinarily, the cover will not be taken off container 1 after the ant trap is charged. After the ant trap has served its purpose and the poisoned bait is used up, the cover 2 may be turned so that window 4 is closed and the ant trap is discarded. In the event that it is desired to remove cover 2 from container 1, the cover is adjusted so that window 4 is open. A screw driver or a similar tool may be inserted in window 4 and the cover may be pried off the container due to the fact that there is a certain amount of give to the spring like flange 6.

It is preferred to use in the present ant trap an improved poisoned bait which has been found to be very effective in destroying entire colonies of ants. In fact such ants as fire ants, Argentine ants, and the like, have been eradicated by the use of the improved poisoned bait. In fact it was found as the result of extensive experiments that the improved bait was many times more effective than arsenical poisons and was effective when arsenical poisons failed to give satisfactory control of the ants. This is particularly true of the fire ant which has been so destructive in citrus groves and the like. The fire ant has been effectively controlled by the improved poisoned bait.

The base of the improved bait is preferably moss. In practice, it has been found that peat moss, spagnum moss and the like have given very satisfactory results.

In preparing the poisoned bait, fat is melted in a pot or other suitable container. To the melted fat peat moss is added and the entire mass is mixed until the fat has been thoroughly and completely absorbed by the moss. A sugar solution containing dissolved thallium sulphate is now added to the peat moss containing fat. The mass is again thoroughly stirred in order to completely distribute the sugar throughout the moss. To the mixture, fresh moss is added and stirring is continued until a moist mass of moss containing fat, sugar and thallium sulphate is produced. In this form, the mass is soft enough to attract ants but is not wet enough to cause leakage to the ant trap. Due to the confinement of the bait in the ant trap, it has been found to remain in a moistened and soft condition even though window 4 is open.

For the purpose of giving those skilled in the art a better understanding of carrying the invention into practice, an illustrative example will be given with respect to the preparation of the improved poisoned ant bait. It is to be understood, however, that the example is for purposes of illustration and that the invention is not to be limited thereto.

It is preferred to melt about 14 to about 18 parts by weight of leaf lard in a suitable container. To the melted lard, about 1 part by weight of peat moss is added. It is preferred to add the peat moss slowly and to agitate the entire mass thoroughly. In this manner, the fat is distributed thoroughly in the peat moss.

A sugar solution is prepared preferably of inverted sugar, tupelo honey and water. In the sugar or syrup solution, about one part to about four parts by weight of thallium sulphate are dissolved. As thallium sulphate is not soluble in fat, I have found that it is possible to incorporate the thallium sulphate in the peat moss by first making a sugar solution and then dissolving the thallium sulphate in said sugar solution. In making up the solution, about 2 to about 8 parts by weight of water are used and about 4 parts by weight of thallium sulphate are used with the aforesaid sugar solution.

The sugar or syrup solution containing thallium sulphate is added to the peat moss containing the absorbed fat. By vigorously agitating the mass a substantially uniform distribution of the sugar solution in the peat moss can be effected. In practice, it has been found that about 25 to about 35 parts by weight of sugar solution can be added to the aforesaid peat moss containing lard. It is preferred to add about 30 parts by weight of the sugar solution as it has been found that this gives best results.

For the purpose of taking up any superfluous sugar solution and/or fat, additional peat moss is added to the container and is thoroughly stirred in the mass. With the foregoing proportions, it has been found that about 2 parts by weight of peat moss can be added with the aforesaid ingredients. In this manner, a soft, moist mass is produced which is very attractive to ants. The smaller ants can suck the poison food from the peat moss whereas large ants can pick particles of the peat moss and carry such particles back to the nest of ants.

In using the improved ant bait, it has been found that inverted sugar and tupelo honey do not crystallize and are sufficiently hygroscopic to take up moisture from the atmosphere and to remain in an attractive form for a considerable period of time. By employing a relatively small window 4 or other opening in the ant trap, the poisoned ant bait has a tendency to "sweat" in the trap thereby keeping it in a better condition than if exposed completely to the air.

It has been found that when the aforesaid poisoned bait is used for the control of ants that the poison does not act immediately but requires the lapse of a certain period of time. Due to this lapse of time, it is possible for the worker ants to carry the food from the ant trap down into their nests for food storage or for feeding the young or for feeding the queen ant. After the food has been distributed not only are the worker ants poisoned but the young ants, the queen ant, and all of the other ants in the nest are poisoned. In this manner, it has been found in practice, practically the entire colony of ants can be eradicated by the use of a sufficient number of ant traps.

When it is desired to use the improved poisoned ant bait for broadcasting on a lawn, a putting green of the golf course, or the like, further amounts of peat moss are added to the mixture to make it substantially dry. For the purpose of obtaining good distribution and for eliminating any accidental poisoning of the animals, etc., the peat moss is made fine enough so that it can be picked up easily by all ants which infest the lawn, golf course, and the like. By having the moss dry enough, the particles thereof will not stick to blades of grass and burn the same. Practical tests have shown that the broadcast method on the putting green of golf courses can be used successfully to control the ants, even though constituted of several species. In this connection, it has been observed that when there are several colonies of ants, the more powerful colonies will take charge of the ant trap and will prevent smaller and less powerful colonies from obtaining any of the poisoned bait containing the food. By broadcasting the peat moss in fine particles over the entire infested area, the difficulty of having one colony of ants monopolize the ant trap is eliminated.

It is to be observed that the present invention provides not only an improved ant trap which is safe even for mailing but also a poisoned ant bait which has the dual function of attracting both sweet-eating and grease-eating ants.

Although the present invention has been described in connection with certain improved embodiments, it is to be observed that variations and modifications may be made by those skilled in the art and that such variations and modifications are to be in the scope and purview of the invention as defined by the appended claims. For instance, any other appropriate and suitable absorbent material can be used in place of moss. Similarly, other soluble thallium salts or other poisons may be used in place of thallium sulphate.

I claim:—

1. An ant trap comprising a metal container having circular and accentuated large bottom surface and a relatively short side extending upwardly, a poisoned ant bait of large exposed surface in said container, a peripheral locking ring incorporated in the side of said container, a resilient flange extending upwardly from said side, a narrow slot provided in said flange, a metal cover fitting on said container, a downwardly extending side provided on said cover, an internal tongue located at the lower end of said side and adapted to coact with said peripheral locking ring on said container to lock the two together, and a slot provided on the side of said cover adapted to register with the slot in the flange of said container to form a non-spilling, narrow window near to the bottom of the trap, whereby ants are given easy access to and egress from the container but spilling or removal of said poisoned bait is effectively prevented.

2. An insect trap comprising a metal container of circular cross-section having accentuated large bottom surface and a relatively short side extending upwardly, a poisoned insect bait of large exposed surface in said container, a peripheral locking ring incorporated in the side of said container, a spring-like flange extending upwardly from said side, a narrow port provided in said flange, a metal cover fitting on said container, a downwardly extending side provided on said cover, an internal tongue located at the lower end of said side and adapted to slidably coact with said peripheral locking ring to lock the two together, and a port provided on the side of said cover capable of being brought into alignment with the port in the flange of said container to form a narrow, non-spilling window close to the bottom of the trap whereby insects are given easy access to and egress from said container but spilling or removal of said poisoned bait is effectively prevented.

OTTO E. LINCK.